March 9, 1965 H. G. PARKE 3,173,109
INDUCTIVELY COUPLED ROTARY DISTRIBUTOR
Filed Jan. 19, 1961 2 Sheets-Sheet 1
FIG. 1
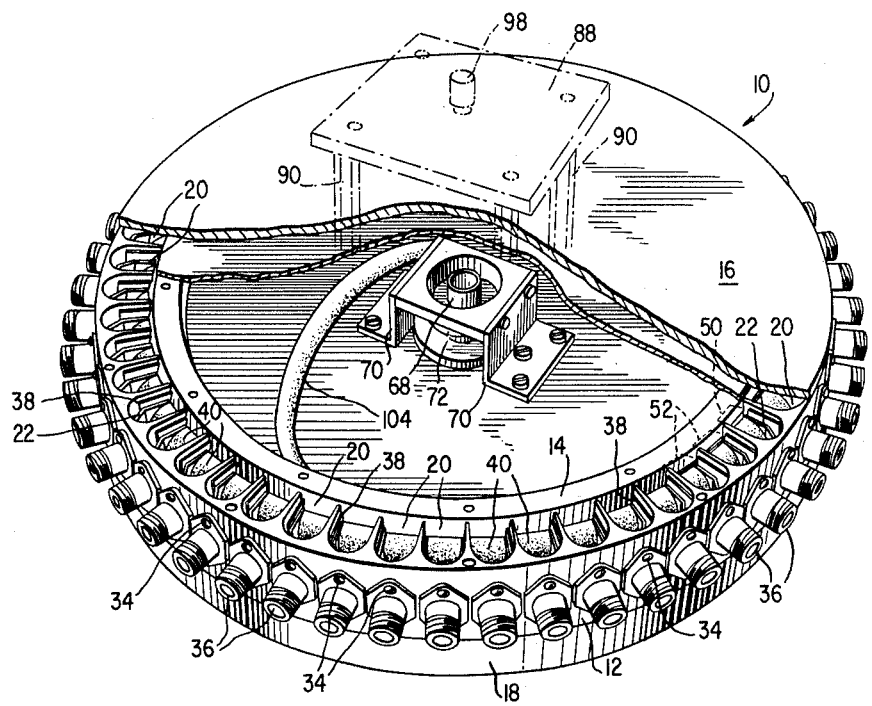
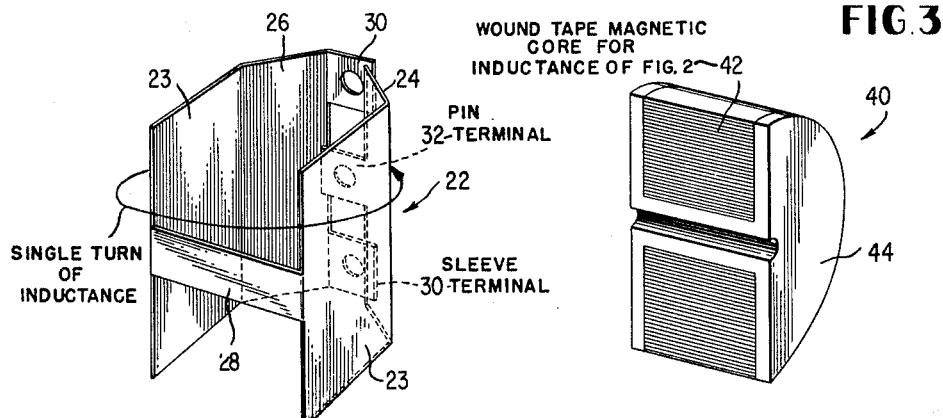
FIG. 2
FIG. 3
INVENTOR.
HARRY G. PARKE
BY
ATTORNEY

*INVENTOR.*
HARRY G. PARKE
*ATTORNEY*

United States Patent Office 3,173,109
Patented Mar. 9, 1965

3,173,109
INDUCTIVELY COUPLED ROTARY DISTRIBUTOR
Harry G. Parke, Brooklyn, N.Y., assignor to Marine Electric Corporation, Brooklyn, N.Y., a corporation of New York
Filed Jan. 19, 1961, Ser. No. 83,787
11 Claims. (Cl. 333—7)

This invention relates generally to switching or distributing devices for radio frequency energy, and more particularly to an improved radio frequency distributor suitable for switching a single R.F. input sequentially into many R.F. outputs or, alternatively, many inputs sequentially into one output.

Distributors of the described type are needed, for example, in quasi-doppler VHF Omni Range Equipment (VOR) by means of which an aircraft pilot may fly any selected bearing to a ground transmitting station. The transmitter in such application, operating in the range of 108–118 mc., is coupled sequentially to a group of antennas arranged in a circle, the effect being that of a single antenna moving in a circle and hence producing frequency modulation of the radiated energy. Reception of such energy emitted in the direction of the airplane when phase compared with a master reference signal radiated in all directions from the same transmitting station determines the bearing of the station with respect to the airplane. For such an application, it is highly desirable that energy be radiated from only one or two antennas at a given instant, that the transmitter energy be smoothly transferred between adjacent antennas, that the phase shift from input to all antennas be equal and independent of coupling and that the load on the transmitter be as nearly constant as possible.

Conventional R.F. distributors employ mechanical contacts for switching or a rotating capacitor plate for the input moving past a number of fixed output plates. Mechanical switching is unsatisfactory in those applications where the separation of radiated energy into pulses is undesirable and because of arcing involved on breaking of contacts. The rotating capacitor type switch is unsatisfactory in that a compromise must be made between the capacitor plate separation to allow ample coupling capacity and the minimum separation where voltage breakdown occurs. In addition, capacitor type distributors suffer from the disadvantages of widely varying impedances during switching and the inefficient feed of considerable energy to unwanted outputs.

To overcome the disadvantages of conventional distributors, the improved device according to the present invention employs inductive coupling. The outputs comprise a series of small coils or loops each in a separate chamber arranged in a circle, and each coil lying substantially in a plane perpendicular to the axis of the circle of loops. Within the circle of output coils is mounted a flat rotor having a single input coil whose plane corresponds with that of the output coils. This arrangement provides for a maximum coupling of the input coil with each output coil in sequence while reducing to a minimum undesirable intercoupling between the input and output coils not immediately adjacent thereto and between nonadjacent output coils.

Accordingly, it is a principal object of the present invention to provide an improved R.F. distributor to enable smooth inductive transfer of energy between adjacent antennas, an equal phase shift between antennas, a constant load on the transmitter and a high degree of isolation between adjacent antennas.

Another object of the invention is to provide an improved inductive R.F. distributor wherein outputs and inputs may be selectively coupled without the disadvantages of mechanical contacts or capacity type switching devices.

A further object of the invention is to provide an improved switching device of the indicated character wherein the input and output coils are substantially surrounded by high magnetic permeability material to increase the coupling and reduce the leakage.

Still another object of the invention is to provide an improved distributor of the above described character having an improved coupler and impedance matching construction to the rotating coil which permits operation over a wide frequency band without altering the rotor speed.

A still further object of the invention is to provide an improved inductive distributor of the above described character having a capacitative coupler to the rotating coil, and which coupler incorporates a variable inductor for providing pure resistance impedance.

Yet another object of the invention is to provide an improved inductive distributor of the above described character in which the rotating coil is resonated at midfrequency of a desired band by capacitative means and connected to a combined capacitative inductive coupling on the rotor by means of a quarter wave length transmission line at said midfrequency carried by the rotor.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is a perspective view of an R.F. distributor constructed according to the invention with parts broken away to reveal internal structural details;

FIG. 2 is an enlarged perspective view of one of the output coils;

FIG. 3 is an enlarged perspective view of a magnetic core utilized within the output coils;

Figure 4:
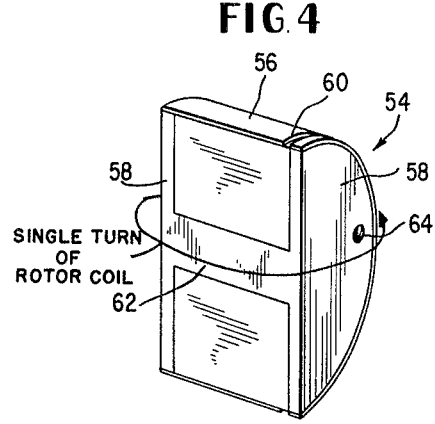
FIG. 4 is an enlarged perspective view of the input coil.

Referring now in more detail to the drawings wherein is illustrated a preferred embodiment of the invention as comprising a planar, disc-like distributor 10 formed of a stator 12, a rotor 14 and upper and lower face plates 16 and 18, respectively. Preferably, the named parts are made of nonmagnetic material, such as aluminum. The stator 12 is in the shape of a circular rim and is provided with fifty vertically extending, closely spaced slots 20.

The output coils 22 are formed preferably of sheet brass and shaped into a single loop (as best illustrated in FIG. 2) having parallel sides 23, inwardly bent sides 24, 26 carrying the terminal lugs 30 and 32, respectively, and a restricted end wall 28 in the form of a slightly curved narrow band. Fifty such output coils 22 are placed in the slots 20 with the narrow band portions 28 disposed in a circle along the inner periphery of the stator 12. Each coil 22 is mechanically separated by its form and mounting from walls of the cavity or slot in which it is seated.

Terminals 30 at one side of the coil are grounded to the stator by the mounting screws 34 of the coaxial connector 36 associated therewith and secured to the outer periphery of the stator. The terminal 32 at the other side of each coil is connected to the central pin of the associated connector 36. Although not essential, desirably the coil side walls 23 may be additionally separated from the cavity walls 20 by shims 38 of insulating material.

Within each loop or coil 22 is preferably inserted a semicircular core 40 of high magnetic permeability material. As best illustrated in FIG. 3, the cores are desirably formed by winding and cementing layers of ferrotron tape 42 on a plastic spool 44 and sawing the resulting bobbin in half. The cores 40 are placed within the loops 22 with their diameters extending vertically and adjacent the narrow bands 28 to close slots 20 at their inner peripheral sides. The top and bottom sides of slots 20 are closed by the upper and lower face plates 16 and 18. The plane of each coil 22 is perpendicular to the axis of the circle of coils and the narrow band portions 28 form a circle centered about the axis of the rotor 14.

The rotor 14 comprises a thin flat disc portion 46 surrounded by an upstanding circular rim 48 which fits closely within the stator allowing but a very small air space between. A series of slots 50, 52, small in number, is formed in the rim 48. The rotor coil 54 is installed in the center slot 50 surrounded by magnetic cores 40, similar to those used in the stator, which are placed in the slots 52.

The design of the rotor coil 54 is such as to prevent the flux generated therein from entering any other part of the rotor. The coil desirably is in the form of a semicircular brass spool, see FIG. 4, having its curved side closed by thin shim brass 56 interrupted near one side 58 of the spool by a saw cut 60. The interior of the coil may be desirably filled with an epoxy or similar resin, not shown. The coil 54 is inserted in the rotor slot 50 so as to position the narrow axis portion 62 in line with the bands 28 of the output coils. One side 58 of the rotor coil is directly grounded to the rotor 14 by a screw or other means contacting the wall of aperture 64, while the other side of the coil loop is insulated from the wall of cavity 50 by insulating shims of suitable material, not shown.

Figure 5:
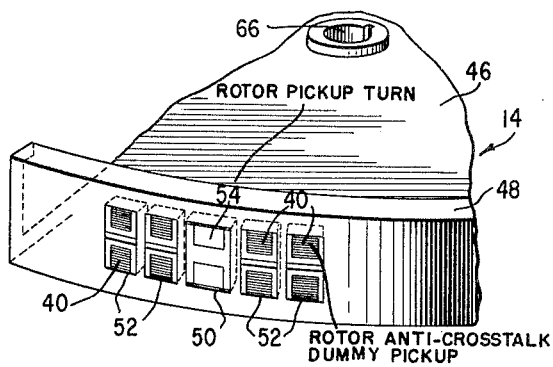
FIG. 5 is a fragmentary perspective view of the rotor portion carrying the input coil.
Figure 6:
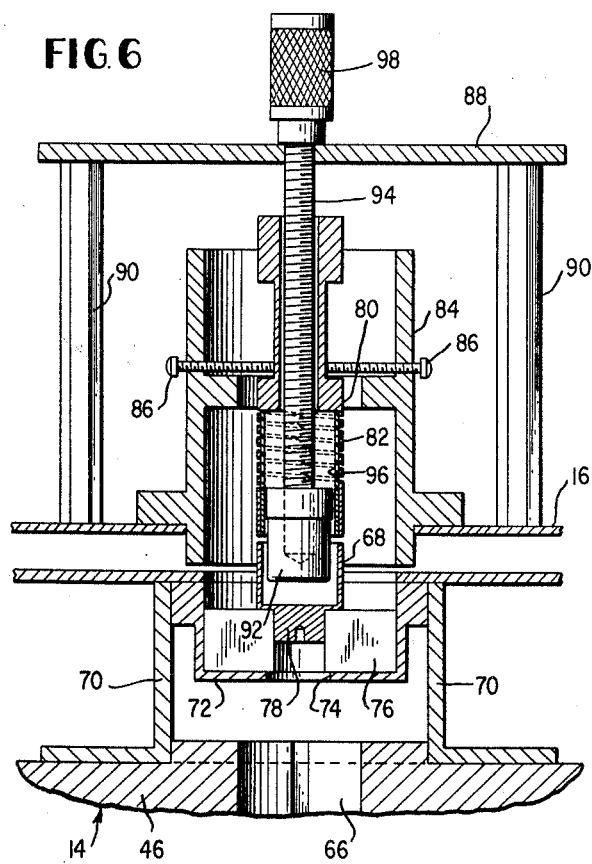
FIG. 6 is a fragmentary axial section of the electrical coupling to the rotor.

The rotor is adapted to be turned at 1800 r.p.m. by means of a shaft, not shown, which engages the key opening 66 at the center of the rotor disc 46, see FIG. 5. To electrically couple the rotor to transmitting or receiving apparatus, a cup 68 of machined and silver plated brass is mounted directly over and axially aligned with the rotor shaft opening. The cup 68 (FIG. 6) is supported in this position by angle brackets 70, an outer cup 72 apertured at 74 in its bottom and a polystyrene or other insulating ring 76. A downward extension 78 on cup 68 is adapted to be connected to the central conductor of a coaxial line.

Above the coupling element 68 and aligned therewith is a hollow brass tube 80 having a helical slot 82 machined in its lower end to form a plurality of conducting turns. The tube 80 is centrally supported in an outer metal tube 84 by screws 86, the latter tube being affixed to the stationary upper face plate 16. A horizontally disposed plate 88, centrally apertured, is supported above the center of face plate 16 by tubular support columns 90. A brass plunger 92 supported on threaded rod 94 is arranged to adjustably extend within both tubular elements 80 and 68 without touching the latter and insulated from the former by means of a polystyrene sleeve 96. The plunger is adjustably driven to vernier measurements by means of a micrometer finger piece 98 which turns the screw 94 in the threaded aperture of plate 88.

Figure 7:
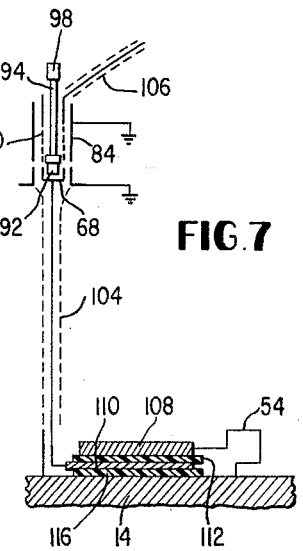
FIG. 7 is a schematic diagram showing the circuit connecting the input coil and the rotor coupling.

It is important that the distributor be tunable across a band of frequencies, for example 108–118 mc., without adjustment or change of the rotor speed. To this end, the rotor coil 54 is resonated at midband frequency (113 mc.) by a low inductance capacitance across its terminals. Desirably, this will consist of a flat top plate 108 (see FIG. 7) connected to rotor coil 54, the body of rotor 14 as a ground plate, and a flat metal tab 110 acting as the capacitance mid tap connected to a coaxial cable 104, and selectable sheets of insulating material 112, 116 respectively, inserted between each plate and the tab. The capacitors thus formed are adjusted so that their junction has an impedance to ground of 50 ohms at 113 mc. when the rotor coil is coupled approximately ¾ to one output coil and ¼ to the adjacent one, each output being loaded at 50 ohms.

It may be shown that the parallel resistance to ground at this point is approximately independent of frequency and is equal to 50 ohms±15% varying with rotor position while the shunt reactance is approximately independent of coupling and varies with frequency, being capacitive in the upper half of the band and inductive in the lower half band. A length of coaxial cable 104 equal to one-quarter wave length at midband is connected at one end to the capacitor junction, and at the other end to the cup 68. It may be shown that the impedance at the far end of this cable may be approximately represented by a series combination of a resistance and a reactance, the resistance being equal to 50 ohms±15%, varying with rotor position but not with frequency while the reactance varies with frequency but not with rotor position.

Above this rotating coax line, attached to the stationary back plate is a similar 50 ohm coaxial line 106. The inner conductor of this stationary line is connected to the hollow helix 80 through which the tight fitting plunger 92 is driven by the micrometer 98. Thus the energy is fed into the rotor from a transmitter through the capacitance between the plunger and the cup 68. The turns machined into the helix 80 act as an inductance in series with the capacitance between parts 92 and 68. Some of these turns are shorted by plunger 92. As the plunger is inserted further into the cup thereby decreasing the series capacitive reactance, it also unshorts some turns, thereby increasing the series inductive reactance. When the plunger 92 is withdrawn from cup 68, the series capacitive reactance is increased and the series inductive reactance reduced. Therefore, by proper adjustment of the micrometer, the series reactance may be substantially eliminated and the input impedance to the rotor reduced to a pure resistance at the operating frequency. Finally, a pi network, not shown, may be used at the input to adjust the input resistance to 50 ohms to match the coaxial line 106 from the transmitter.

It will be apparent from the above description that the inductive distributor operates to provide a smooth transfer of energy from input or rotor coil 54 to each of the antenna pickup coils 22 in sequence, that the phase shift from input to all antennas will be equal and independent of coupling while the load on the transmitter will be as nearly constant as possible.

The narrow portions 28 of the output loops form a circle around the axis of the rotor. It can readily be seen that for constant excitation of the rotor loop 54, the flux linking this circle is constant. The flux from the rotor coil 54 links almost entirely with the one or two output coils the rotor coil is facing. Leakage of flux is restricted by the high reluctance air paths through the narrow clearances between rotor and stator as compared to the low reluctance path through the semicircular ferromagnetic slug in the facing output coil. Furthermore, half of the leakage flux is bypassed through the magnetic slugs in the rotor surrounding the rotor coil. As a result of this construction, it has been possible to obtain 30 to 31 db of isolation to adjacent antennas as compared to the 18 to 20 db which is the best that has been done previously with conventional distributors. These results are, of course, partly due to the arrangement of the input and pickup coils in a plane perpendicular to the axis of the rotor which minimizes the inductive coupling between nonadjacent coils.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A radio frequency distributor comprising a series of non-overlapping stationary coils arranged in a circle and lying substantially in a single plane, a rotating coil carried by a metallic rotor and revolvable in the plane of said stationary coils for sequential inductive coupling with the stationary coils, and means for connecting separate energy transmission lines to each of said rotating and stationary coils, each of said rotating and stationary coils being formed of single loop of sheet material constricted to a narrow band in one portion of each said loop, the narrow band portions of the stationary coil loops being arranged in said circle and the narrow band portion of the rotary coil loop revolving in a second circle of slightly different diameter and concentric with the first circle.

2. A radio frequency distributor comprising a series of non-overlapping stationary coils arranged in a circle and lying substantially in a single plane, a rotating coil carried by a metallic rotor and revolvable in the plane of said stationary coils for sequential inductive coupling with the stationary coils, and means for connecting separate energy transmission lines to each of said rotating and stationary coils, said rotor being provided with a rotating coupling element positioned axially thereof, a capacitance means connected across the terminals of said rotating coil to resonate said coil at the midfrequency of a band of frequencies, the junction of said coil and capacitance means being connected by a quarter wave length transmission line at said midfrequency to said rotating coupling element, and stationary means capacitatively coupling with said rotating coupling element for connection to a transmitting or receiving apparatus.

3. A radio frequency distributor as described in claim 2 wherein said rotating coupling element comprises a cup and said stationary means for capacitively coupling therewith comprises a hollow helix axially aligned with said cup and a metal plunger insulated from the helix and adjustable axially to extend into without touching said cup.

4. A radio frequency distributor as described in claim 3 wherein said plunger is provided with a micrometer adjusting to vary the turns of said helix shorted by said plunger.

5. A radio frequency distributor as described in claim 2 wherein said capacitance means connected across the terminals of said rotating coil comprises a pair of capacitors in series formed by a top plate and a portion of said rotor as ground, a center tab separated from said top plate and rotor portion by dielectric material, and said center tab being connected to said rotating coupling element.

6. A radio frequency distributor as described in claim 11 wherein said capacitance means connected across the terminals of said rotating loop is adjustable by varying the dielectric or dielectric thickness.

7. A coupling device for transmitting radio frequency energy to a rotor without use of slip rings or other conductive coupling comprising a tubular conducting element fixed axially on said rotor, a stationary metallic helix axially aligned with said element, and a metal plunger insulated from the helix and adjustable axially thereto to extend into without touching said tubular conducting element, said plunger being so proportioned that it partially subtends some of the turns of said helix whereby adjustment by movement of the plunger closer to the rotor to reduce the capacitive impedance between the plunger and rotor will also increase the inductive impedance of the helix, the effect being to change the resonant frequency of a series tuned circuit connected to the coupling device without greatly changing its characteristic impedance.

8. A coupling device as described in claim 7 wherein said plunger is provided with a micrometer screw adjustment means.

9. A coupling device as described in claim 7 wherein said rotor carries a coil which is connected to said tubular conducting element by a quarter wave length transmission line at a selected frequency.

10. A coupling device as described in claim 9 wherein said coil on the rotor is shorted by a capacitance means for resonating at said selected frequency.

11. A radio frequency distributor comprising a metal stator in the shape of an annulus, a series of peripheral cavities spaced about the inner surface of said stator, a series of stationary single turn coils arranged in said cavities with the axis of each coil parallel to one another and to the axis of the stator, a disc-like metal rotor coaxial with said stator and having at least one cavity in its peripheral edge, a single turn rotating coil disposed in the cavity of said rotor and revolvable in the plane of said stationary coils for sequential inductive coupling with the stationary coils, said cavities of the stator and rotor each having three conducting walls parallel to the axis of the rotor but being open on the side facing the rotor and stator respectively so that flux is effectively prevented from passing from one such cavity to another, said rotor being wholly contained within the central opening of the annular stator, and means for connecting separate energy transmisison lines to each of said rotating and stationary coils, said means including a series of coaxial connectors mounted on the outer surface of the stator.

References Cited in the file of this patent

UNITED STATES PATENTS

| | | |
|---|---|---|
| 2,098,002 | Guerin | Nov. 2, 1937 |
| 2,612,635 | West et al. | Sept. 30, 1952 |
| 2,833,862 | Tolson | May 6, 1958 |
| 2,894,220 | Ridgers | July 7, 1959 |
| 2,996,694 | Berman | Aug. 15, 1961 |